US012166255B2

(12) United States Patent
Fang et al.

(10) Patent No.: US 12,166,255 B2
(45) Date of Patent: Dec. 10, 2024

(54) PHASE SHIFTER WITH AT LEAST ONE PHASE CONTROL ELEMENT HAVING A MEMBRANE BRIDGE INCLUDING A SUPPORT PORTION CONNECTED TO A TRANSMISSION LINE EXTENSION PORTION BY AN INSULATING LAYER

(71) Applicants: Beijing BOE Technology Development Co., Ltd., Beijing (CN); BOE TECHNOLOGY GROUP CO., LTD., Beijing (CN)

(72) Inventors: Jia Fang, Beijing (CN); Feng Qu, Beijing (CN); Jingwen Guo, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 483 days.

(21) Appl. No.: 17/514,798

(22) Filed: Oct. 29, 2021

(65) Prior Publication Data

US 2022/0320698 A1 Oct. 6, 2022

(30) Foreign Application Priority Data

Mar. 31, 2021 (CN) ........................ 202110351310.8

(51) Int. Cl.

*H01P 1/18* (2006.01)
*H01P 1/10* (2006.01)

(Continued)

(52) U.S. Cl.

CPC ................ *H01P 1/184* (2013.01); *H01P 1/10* (2013.01); *H01P 1/18* (2013.01); *H01P 3/02* (2013.01); *H01P 11/001* (2013.01)

(58) Field of Classification Search

CPC .. H01P 1/18; H01P 1/184; H01P 1/185; H01P 1/10

(Continued)

(56) References Cited

U.S. PATENT DOCUMENTS 6,741,207 B1 * 5/2004 Allison et al. .......... H01P 1/184 333/164
2002/0186108 A1 * 12/2002 Hallbjorner .............. H01Q 3/38 335/78

(Continued)

FOREIGN PATENT DOCUMENTS

CN 109193081 A 1/2019

*Primary Examiner* — Benny T Lee

(74) *Attorney, Agent, or Firm* — HOUTTEMAN LAW LLC

(57) ABSTRACT

The present disclosure provides a phase shifter, a method for fabricating the same, and an antenna. The phase shifter includes a substrate, first and second transmission lines spaced apart from each other on the substrate, and at least one phase control element on the substrate. Each phase control element includes a membrane bridge and a transmission line extension which is on the substrate, between the first and second transmission lines, and electrically coupled to the first transmission line; the membrane bridge is on a side of the transmission line extension distal to the substrate, opposite to and spaced apart from the transmission line extension, and electrically coupled to the second transmission line. The membrane bridge is configured to move a portion of the membrane bridge in response to the first and second transmission lines being applied with different voltages, to change a distance from the transmission line extension.

11 Claims, 5 Drawing Sheets

(51) Int. Cl.
*H01P 3/02* (2006.01)
*H01P 11/00* (2006.01)

(58) Field of Classification Search
USPC .................................................. 333/139, 161
See application file for complete search history.

(56) References Cited

U.S. PATENT DOCUMENTS

2003/0146806 A1* 8/2003 Nuecther et al. ....... H01P 1/184
333/156
2005/0212705 A1* 9/2005 Legay et al. .............. H01P 1/18
343/700 MS

* cited by examiner

PHASE SHIFTER WITH AT LEAST ONE PHASE CONTROL ELEMENT HAVING A MEMBRANE BRIDGE INCLUDING A SUPPORT PORTION CONNECTED TO A TRANSMISSION LINE EXTENSION PORTION BY AN INSULATING LAYER

CROSS-REFERENCE TO RELATED APPLICATION

This application claims the benefit of priority to Chinese Patent Application No. 202110351310.8 filed on Mar. 31, 2021, the contents of which are incorporated herein in their entirety by reference.

TECHNICAL FIELD

The present disclosure relates to the field of communication technologies, and particularly relates to a phase shifter, a method for fabricating a phase shifter, and an antenna.

BACKGROUND

A Phase shifter is a device capable of adjusting a phase of a wave. The phase shifter has wide application in the fields of radars, missile attitude control, accelerators, communication, instruments, even music and the like. The conventional phase shifter is mainly implemented by using a switch made of a ferrite material, a PIN diode or a field effect transistor (FET), but the large-scale application of the conventional phase shifter is limited due to its complex process, high fabricating cost, large volume and the like.

SUMMARY OF THE INVENTION

In an aspect, the present disclosure provides a phase shifter including a substrate, first and second transmission lines spaced apart from each other on the substrate, and at least one phase control element on the substrate, wherein each of the at least one phase control element includes a transmission line extension portion and a membrane bridge, and the transmission line extension portion is on the substrate, is between the first transmission line and the second transmission line, and is electrically coupled to the first transmission line;

the membrane bridge is on a side of the transmission line extension portion distal to the substrate, a portion of the membrane bridge is opposite to and spaced apart from the transmission line extension portion, and the membrane bridge is electrically coupled to the second transmission line; and the portion of the membrane bridge is configured to move in response to the first and second transmission lines being applied with different voltages, so as to change a distance of the portion of the membrane bridge from the transmission line extension portion.

In an embodiment, the membrane bridge includes a horizontal portion and a first support portion, the horizontal portion is on the side of the transmission line extension portion distal to the substrate and is opposite to the transmission line extension portion; and the first support portion is between the horizontal portion and the second transmission line, and electrically couples one end of the horizontal portion to the second transmission line.

In an embodiment, the other end of the horizontal portion is a free end configured to move in response to the first and second transmission lines being applied with different voltages, so as to change the distance from the other end of the horizontal portion to the transmission line extension portion.

In an embodiment, the phase shifter further includes an insulating layer on the transmission line extension portion and on the side of the transmission line extension portion distal to the substrate, wherein the insulating layer is configured to prevent the other end of the horizontal portion of the membrane bridge from electrically communicating with the transmission line extension portion when moving in a direction approaching the transmission line extension portion.

In an embodiment, the membrane bridge further includes a second support portion and an insulating layer, the insulating layer is on the transmission line extension portion and is on the side of the transmission line extension portion distal to the substrate; and the horizontal portion is configured to bend in a direction approaching the transmission line extension portion in response to the first and second transmission lines being applied with different voltages.

In an embodiment, the transmission line extension portion is in a same layer as the first transmission line.

In an embodiment, the transmission line extension portion and the first transmission line are formed as a single piece.

In an embodiment, at least one hollow portion is provided in the membrane bridge, and the at least one hollow portion penetrates through the membrane bridge in a direction perpendicular to a plane in which the substrate is located.

In an embodiment, the at least one hollow portion penetrates through the horizontal portion in the direction perpendicular to the plane in which the substrate is located.

In an embodiment, the phase shifter further includes first and second bias wires each disposed on the substrate and electrically coupled to the first and second transmission lines, respectively, wherein the first and second bias wires are configured to apply different voltages to the first and second transmission lines, respectively.

In another aspect, the present disclosure further provides a method for fabricating the phase shifter described above, and the method includes:

forming, on the substrate, the first transmission line and the second transmission line spaced apart from each other and a transmission line extension portion of the at least one phase control element;

forming a sacrificial layer on the substrate having the first transmission line, the second transmission line, and the transmission line extension portion thereon, the sacrificial layer being configured to support the membrane bridge of the at least one phase control element in forming the membrane bridge;

forming the membrane bridge on the substrate having the sacrificial layer thereon, the membrane bridge being on a side of the sacrificial layer distal to the substrate; and stripping the sacrificial layer.

In an embodiment, after the forming of the first transmission line and the second transmission line spaced apart from each other and the transmission line extension portion of the at least one phase control element, on the substrate, and before the forming of the sacrificial layer on the substrate having the first transmission line, the second transmission line, and the transmission line extension portion thereon, the method further includes: forming an insulating layer on the transmission line extension portion and on the side of the transmission line extension portion distal to the substrate, the insulating layer being configured to prevent the portion of the membrane bridge from electrically communicating with the transmission line extension portion when moving in a direction approaching the transmission line extension portion.

In an embodiment, after the forming of the membrane bridge on the substrate having the sacrificial layer thereon and before the stripping of the sacrificial layer, the method further includes:

forming at least one hollow portion in the membrane bridge, the at least one hollow portion penetrating through the membrane bridge in a direction perpendicular to a plane in which the substrate is located In another aspect, the present disclosure further provides an antenna including the phase shifter described above.

DETAILED DESCRIPTION OF THE INVENTION

In order to make those skilled in the art better understand the technical solution of the present disclosure, a phase shifter, a method for fabricating a phase shifter, and an antenna according to the present disclosure are described in detail below with reference to the accompanying drawings, where like features are denoted by the same reference labels throughout the detail description of the drawings.

In the related art, a liquid crystal phase shifter is proposed, the liquid crystal phase shifter, although it has a low cost, cannot be applied to circumstances having high speed requirements, such as 5G MIMO and the like, due to the following disadvantages of the liquid crystal phase shifter: the operating principle of the liquid crystal phase shifter is that the dielectric constant between the capacitor plates is changed by the deflection of liquid crystal under the control of a voltage, so as to change the capacitance, and in this way, not only that the range of the change of the capacitance is narrow, but also that the response time of the phase shifter is necessarily long (generally more than 10 ms) due to the deflection of liquid crystal molecules. The liquid crystal itself has a high dielectric loss, resulting in a high loss of the phase shifter.

Figure 1:
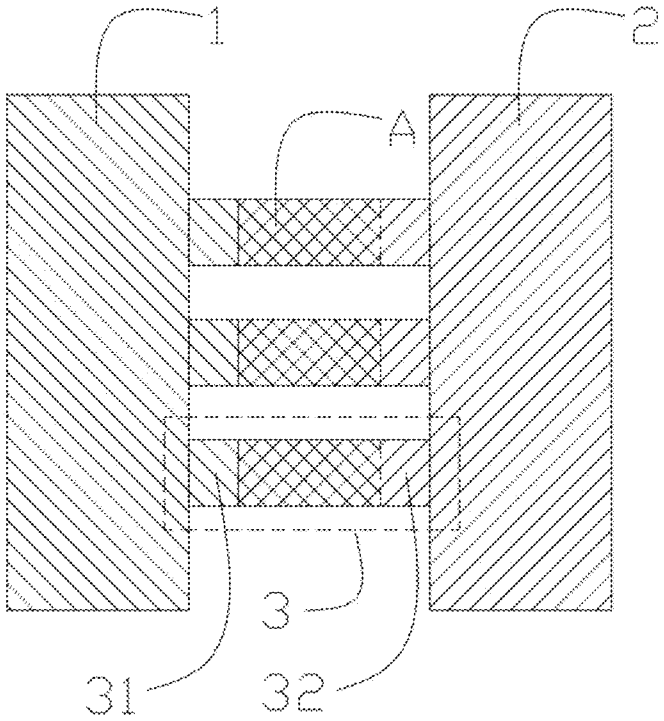
FIG. 1 is a schematic diagram of partial structure of a phase shifter according to an embodiment of the present disclosure.
Figure 2:
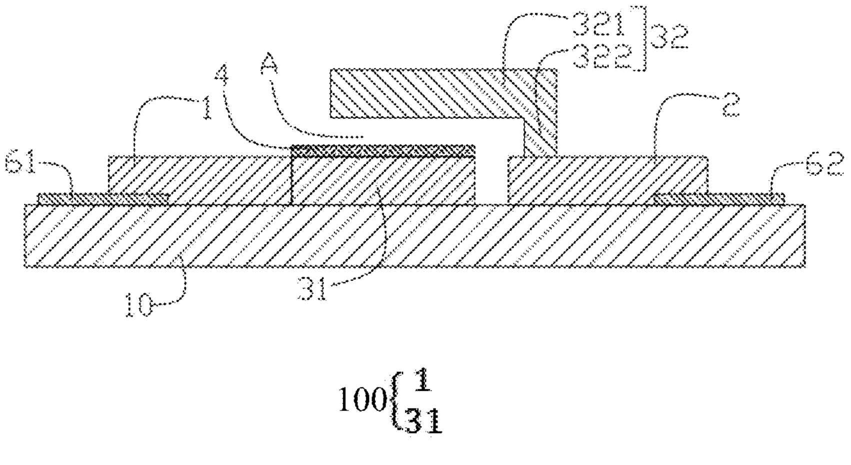
FIG. 2 is a cross-sectional view of partial structure of a phase shifter according to an embodiment of the present disclosure.
Figure 3:
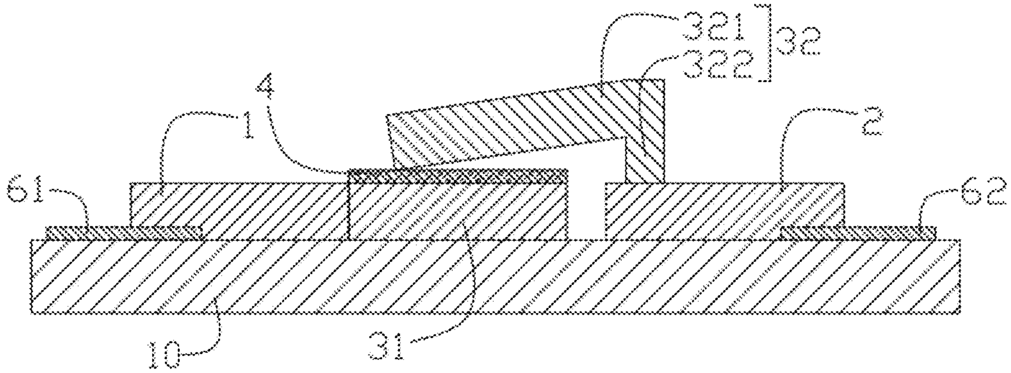
FIG. 3 is a cross-sectional view of another partial structure of a phase shifter according to an embodiment of the present disclosure.

Referring to FIG. 1 and FIG. 2, a phase shifter according to an embodiment includes a substrate 10 of FIG. 2, a first transmission line 1 and a second transmission line 2 on the substrate 10 of FIG. 2 spaced apart from each other, and at least one phase control element 3 of FIG. 1 on the substrate 10 of FIG. 2. Only three phase control elements 3 are schematically shown in FIG. 1, but the disclosure is not limited thereto. In an embodiment as shown in FIG. 2, the substrate 10 is, for example, a glass substrate. Each of the at least one phase control element 3 includes a transmission line extension portion 31 and a membrane bridge 32. The transmission line extension portion 31 is disposed on the substrate 10 and between the first transmission line 1 and the second transmission line 2, and the transmission line extension portion 31 is electrically coupled to the first transmission line 1. In an embodiment, the transmission line extension portion 31 and the first transmission line 1 may be in a same layer, so that they may be simultaneously fabricated by a single process, thereby simplifying the process step. For example, the transmission line extension portion 31 and the first transmission line 1 may be formed as a single piece 100 (see FIG. 2). Alternatively, in an embodiment, the transmission line extension portion 31 and the first transmission line 1 may be in different layers, and in this case, the transmission line extension portion 31 and the first transmission line 1 may be electrically conducted (i.e., electrically communicated) by providing a via hole or the like. The membrane bridge 32 is on a side of the transmission line extension portion 31 distal to the substrate 10, is opposite to the transmission line extension portion 31 and is spaced apart from the transmission line extension portion 31, and the membrane bridge 32 is electrically coupled to the second transmission line 2. A portion of the membrane bridge 32 is configured to move to change a distance from the transmission line extension portion 31 when the first transmission line 1 and the second transmission line 2 are applied with different voltages. As shown in FIG. 3, when a voltage is applied, the left end of the membrane bridge 32 moves downward a certain distance relative to the initial position in FIG. 2.

By switching between applying different voltages and not applying voltages to the first transmission line 1 and the second transmission line 2, a position at which the portion of the membrane bridge 32 is located may be switched between the initial position and a position closer to the transmission line extension portion than the initial position, so that the distance between the membrane bridge 32 and the transmission line extension portion 31 as two capacitor plates can be changed (the capacitor region is shown as region "A" in FIGS. 1 and 2), and the capacitance of the capacitor formed by the membrane bridge 32 and the transmission line extension portion 31 can be changed. Compared with the method of changing the size of the capacitance utilizing liquid crystal deflection in the prior art, the method of changing the size of the capacitance in the embodiments can enlarge the change range of the capacitance, so that the phase shifting effect by a single phase control element is more significant. The phase shifter according to the embodiment of the disclosure is a phase shifter based on micro-electro-mechanical system (MEMS). Compared with the liquid crystal phase shifter, the phase shifter according to the embodiments of the disclosure has shorter response time and lower dielectric loss, which can expand the usage scenario and reduce the loss of the antenna including the phase shifter. The phase shifter according to the embodiment is, for example, a differential phase shifter. The membrane bridge 32 has an elasticity to enable the position at which the portion of the membrane bridge 32 is located to be switched between the initial position and another position closer to the transmission line extension portion than the initial position by elastic deformation while maintaining electrical connection between the membrane bridge 32 and the second transmission line 2. The membrane bridge 32 is made of a material having a low dielectric loss, such as copper, gold, silver, aluminum, or the like.

In an embodiment, the first transmission line 1, the second transmission line 2 and the transmission line extension portion 31 may be made of a material having a low dielectric loss, such as copper, gold, silver, aluminum, etc.

In practical applications, the first transmission line 1 and the second transmission line 2 may be applied with different voltages (e.g., bias voltages) by a control unit. For example, the first transmission line 1 is continuously applied with a voltage, for example, of 0 V. In this case, the position at which the portion of the membrane bridge 32 is located may be switched between the initial position and the position closer to the transmission line extension portion than the initial position by selectively applying or not applying a voltage (greater than 0 V) to the second transmission line 2. It should be noted that, in the present embodiment, both the number of the transmission line extension portion 31 and the number of the membrane bridge 32 included in each phase control element 3 are one, but the embodiments of the present disclosure are not limited thereto. In practical applications, the number of the transmission line extension portion 31 and the number of the membrane bridge 32 included in each phase control element 3 may be in plural, and in this case, the number of transmission line extension portion 31 and the number of the membrane bridge 32 included in different phase control elements 3 may be the same or different, and the voltages applied to different phase control elements 3 may be individually controlled.

In the present embodiment, as shown in FIG. 2, the membrane bridge 32 includes a horizontal portion 321 and a support portion 322. In an embodiment, the horizontal portion 321 is on a side of the transmission line extension portion 31 distal to the substrate 10 and opposite to the transmission line extension portion 31.

The support portion 322 is coupled between one end (i.e., the right end in FIG. 2) of the horizontal portion 321 and the second transmission line 2, so that the horizontal portion 321 has a distance from the transmission line extension portion 31, and the horizontal portion 321 electrically communicates with the second transmission line 2. The other end (i.e., the left end in FIG. 2) of the horizontal portion 321 is a free end that may move in a direction approaching the transmission line extension portion 31 when the first transmission line 1 and the second transmission line 2 are applied with different voltages, as shown in FIG. 3. By using the cantilevered membrane bridge 32, it is advantageous to form the membrane bridge 32 as an elastic structure that generates elastic deformation of downward bending when voltages are applied.

In the present embodiment as shown in FIG. 2, the phase shifter may further include an insulating layer 4, the insulating layer 4 is disposed on the transmission line extension portion 31 and on a side of the transmission line extension portion distal to the substrate 10 to prevent the horizontal portion 321 of the membrane bridge 32 from electrically communicating with the transmission line extension portion 31 when the horizontal portion 321 moves in a direction approaching the transmission line extension portion 31. The insulating layer 4 is made of an insulating material such as $SiO_x$, $SiN_x$, or $Al_2O_3$.

In the present embodiment as shown in FIG. 2, the phase shifter may further include a first bias wire 61 and a second bias wire 62, and the first bias wire 61 and the second bias wire 62 are disposed on the substrate 10 and electrically coupled to the first transmission line 1 and the second transmission line 2, respectively, so as to apply different voltages to the first transmission line 1 and the second transmission line 2 through the first bias wire 61 and the second bias wire 62, respectively. The first bias wire 61 and the second bias wire 62 are electrically coupled to the control unit described above, for example. The first bias wire 61 and the second bias wire 62 may be made of a high resistivity material such as Indium tin oxide (ITO) or Mo.

Figure 4:
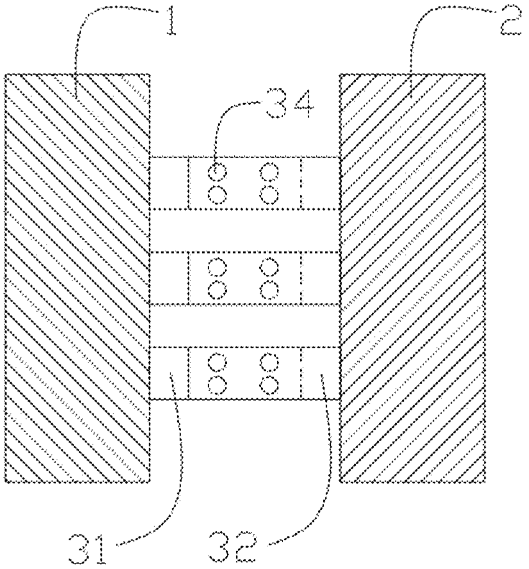
FIG. 4 is a schematic diagram of partial structure of a phase shifter according to an embodiment of the present disclosure.
Figure 5:
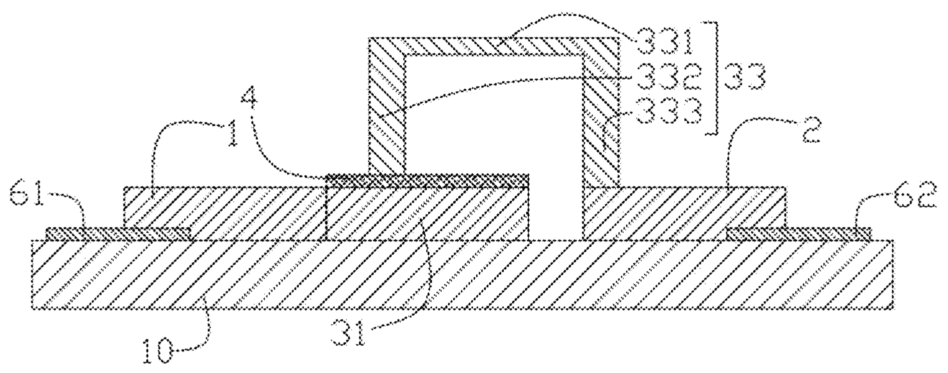
FIG. 5 is a cross-sectional view of partial structure of a phase shifter according to an embodiment of the present disclosure.

In the present embodiment, as shown in FIG. 4, at least one hollow portion 34 is provided in the membrane bridge 32, and the hollow portion 34 penetrates through the membrane bridge 32 in a direction perpendicular to the plane of the substrate 10 as shown in FIG. 3, for example, penetrates through the horizontal portion 331 (FIG. 5). In this way, in the process of fabricating the membrane bridge 32 by using a sacrificial layer, when a process (for example, wet etching or dry etching) for removing the sacrificial layer is performed, an etching solution or plasma may be used to etch the sacrificial layer through the hollow portion 34, so that the etching rate can be increased, and the process efficiency can be further improved. The hollow portion 34 is, for example, a through hole.

Figure 6:
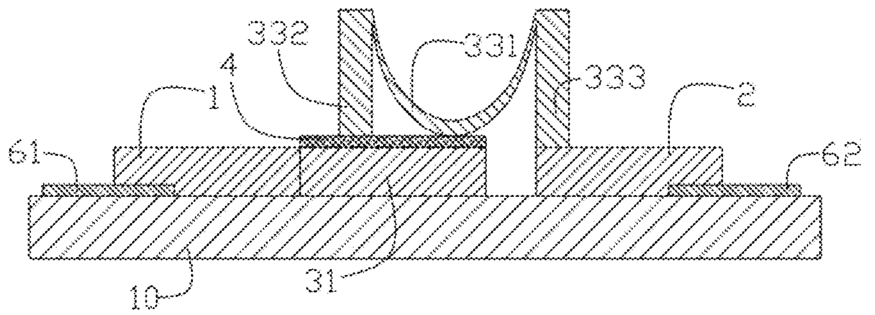
FIG. 6 is a cross-sectional view of another partial structure of a phase shifter according to an embodiment of the present disclosure.

Referring to FIG. 5 and FIG. 6, the phase shifter according to the embodiment also includes the first transmission line 1, the second transmission line 2 and at least one phase control element, and each of the at least one phase control element includes a transmission line extension portion 31 and a membrane bridge 33 of FIG. 5. Compared with the embodiments mentioned above with respect to FIG. 3, the difference between this embodiment and the embodiments mentioned above is that: the structure of the membrane bridge 33 of FIG. 5 is different from that of the membrane bridge 32 described above.

In an embodiment, the membrane bridge 33 of FIG. 5 includes a horizontal portion 331, a first support portion 332, and a second support portion 333; also, the phase shifter further includes an insulating layer 4. In an embodiment, the horizontal portion 331 is on a side of the transmission line extension portion 31 distal to the substrate 10, and is opposite to the transmission line extension portion 31; the insulating layer 4 is disposed on the transmission line extension portion 31 and on a side of the transmission line extension portion 31 distal to the substrate 10; the first support portion 332 is coupled between one end of the horizontal portion 331 and the insulating layer 4; the second support portion 333 is coupled between the other end of the horizontal portion 331 and the second transmission line 2, and electrically conducts the horizontal portion 331 and the second transmission line 2. The first and second support portions 332 and 333 are configured to keep the horizontal portion 331 at a distance from the transmission line extension portion 31, and the second support portion 333 is configured to electrically conduct the horizontal portion 331 with the second transmission line 2.

The horizontal portion 331 is configured to be bent in a direction approaching the transmission line extension portion 31 when the first transmission line 1 and the second transmission line 2 are applied with different voltages. As shown in FIG. 6, when the voltages are applied, the middle portion of the horizontal portion 331 is bent toward the transmission line extension portion 31, which also changes the distance between two capacitor plates formed by the membrane bridge 33 of FIG. 5 and the transmission line extension portion 31, and thus changes the capacitance of the capacitor formed by the membrane bridge 33 and the transmission line extension portion 31.

The membrane bridge 33 has an elasticity to enable a position at which the horizontal portion 331 is located to be switched between an initial position and a position closer to the transmission line extension portion than the initial position by elastic deformation while maintaining electrical connection between the membrane bridge 33 and the second transmission line 2. The membrane bridge 33 is made of a material having a low dielectric loss, such as copper, gold, silver, aluminum, or the like.

It should be noted that the embodiments of the present disclosure are not limited to the membrane bridge structure in each of the above embodiments, and in practical applications, any other membrane bridge structure may be adopted as long as it may move in a direction approaching the transmission line extension portion 31 when the first transmission line 1 and the second transmission line 2 are applied with different voltages.

The structure and function of other components of the present embodiment are the same as those of the above embodiments, and since the detailed description has been given in the above embodiments, the description will not be repeated here.

Figure 8:
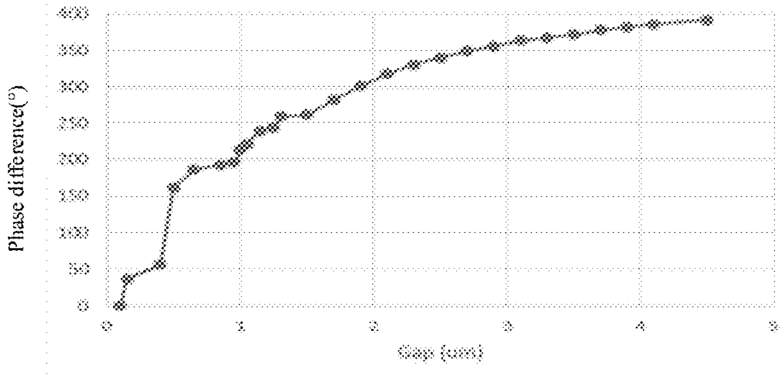
FIG. 8 is a graph of simulated phase shifting of a phase shifter according to an embodiment of the present disclosure.

FIG. 8 is a graph of simulated phase shifting of a phase shifter according to an embodiment of the present disclosure. As shown in FIG. 8, the abscissa expresses the pitch (or gap) between two capacitor plates formed by the membrane bridge 32 and the transmission line extension portion 31, in units of μm; and the ordinate expresses the phase difference in units of degrees. As can be seen from FIG. 8, when the pitch is varied between 0 μm and 4.5 μm, the phase difference in ° is varied between 0° and 400°, which is significantly larger in the variation range than that in the method of using liquid crystal deflection in the prior art, so that the phase shifting effect by a single phase control element can be more significant.

An embodiment of the present disclosure further provides a method for fabricating a phase shifter, including Steps 1 to 6, by taking the case of the phase shifter shown in FIG. 1 as an example.

Figure 7A:
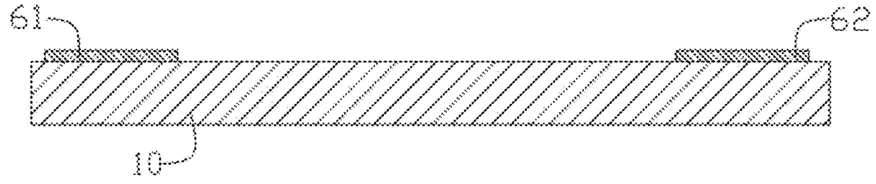
FIGS. 7A to 7F are diagrams illustrating various stages in a method for fabricating a phase shifter according to an embodiment of the present disclosure.

Step 1 includes forming the first bias wire 61 and the second bias wire 62 on the substrate 10 as shown in FIG. 7A.

The first bias wire 61 and the second bias wire 62 are fabricated by deposition process such as magnetron sputtering.

It should be noted that, in practical applications, applying the voltages on the first transmission line 1 and the second transmission line 2 may also be implemented in other manners. The first bias wire 61 and the second bias wire 62 may not be provided depending on the manner of applying the voltages.

Figure 7B:
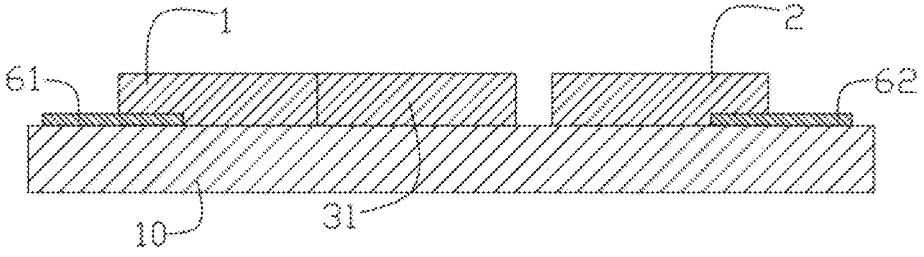

Step 2 includes forming, on the substrate 10, the first transmission line 1 and the second transmission line 2 arranged spaced apart from each other, and the transmission line extension portion 31 of the at least one phase control element, as shown in FIG. 7B.

In an embodiment, the transmission line extension portion 31 is between the first transmission line 1 and the second transmission line 2, is electrically coupled to the first transmission line 1, and serves as a lower capacitor plate.

The first transmission line 1, the second transmission line 2 and the transmission line extension portion 31 are simultaneously fabricated, and may be fabricated by magnetron sputtering, evaporation or electroplating.

Figure 7C:
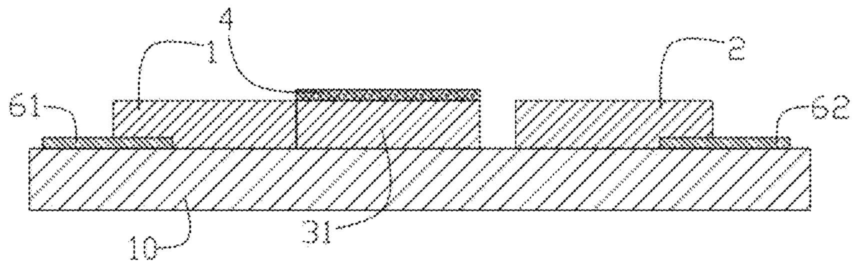

Step 3 includes forming an insulating layer 4 on the transmission line extension portion 31 and on the side of the transmission line extension portion 31 distal to the substrate 10, as shown in FIG. 7C.

The insulating layer 4 is used to prevent a portion of the membrane bridge 32 (see FIG. 7E) from electrically communicating with the transmission line extension portion 31 when the portion of the membrane bridge moves in the direction approaching the transmission line extension portion 31.

The insulating layer 4 may be formed by a deposition process such as plasma enhanced chemical vapor deposition (PECVD) process, physical vapor deposition (PVD) process, atomic layer deposition (ALD) process, or the like.

It should be noted that, in practical applications, the insulating layer 4 may not be provided, provided that a portion of the membrane bridge 32 (see FIG. 7E) does not contact the transmission line extension portion 31 when moving in the direction approaching the transmission line extension portion 31.

Figure 7D:
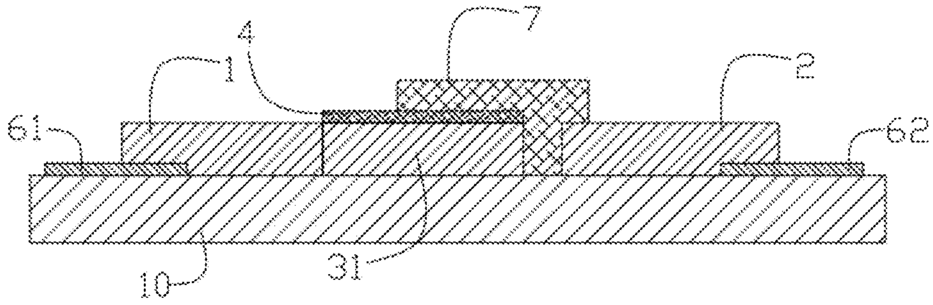

Step 4 includes forming the sacrificial layer 7 on the substrate 10 having the first transmission line 1, the second transmission line 2 and the transmission line extension portion 31 thereon, as shown in FIG. 7D.

Figure 7E:
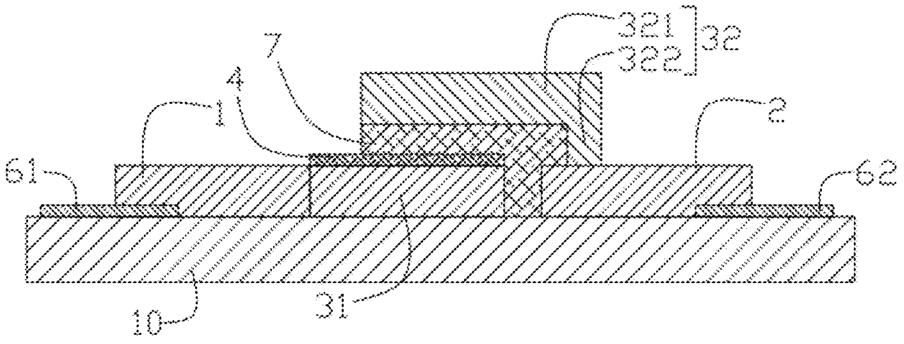

The sacrificial layer 7 is configured to support the membrane bridge 32 (see FIG. 7E) in the subsequent step of forming the membrane bridge 32 (see FIG. 7E);

That is, in the subsequent process of forming the membrane bridge 32 (see FIG. 7E), the material for forming the membrane bridge 32 (see FIG. 7E) may be deposited on the sacrificial layer 7. The sacrificial layer 7 may be made of, for example, polyether polyol (DL 1000C).

The sacrificial layer 7 may be fabricated, for example, by spin coating.

Step 5 includes forming the membrane bridge 32 on the substrate 10 having the sacrificial layer 7 described above thereon, as shown in FIG. 7E.

The membrane bridge 32 is on a side of the sacrificial layer 7 distal to the substrate 10, is opposite to the transmission line extension portion 31 and is spaced apart from the transmission line extension portion, and the membrane bridge 32 is electrically coupled to the second transmission line 2. A portion of the membrane bridge 32 is configured to move to change the distance from the transmission line extension portion 31 when the first transmission line 1 and the second transmission line 2 are applied with different voltages.

The membrane bridge 32 may be fabricated by magnetron sputtering, evaporation, electroplating or the like.

It should be noted that, in order to reduce the process difficulty and reduce the process accuracy requirement, the right boundary of the sacrificial layer 7 shown in FIG. 7E protrudes relative to the left boundary of the second transmission line 2, that is, the right end of the sacrificial layer 7 is stacked on the second transmission line 2, and in this case, the left boundary of the support portion 322 of the membrane bridge 32 has a distance from the left boundary of the second transmission line 2, as shown in FIG. 7E and FIG. 2. However, the embodiment of the present disclosure is not limited thereto, and in practical applications, according to different processes and precision requirements of processes, for example, as shown in FIG. 5, the left boundary of the second support portion 333 of the membrane bridge 33 may be aligned with the left boundary of the second transmission line 2, that is, there is no distance therebetween.

Figure 7F:
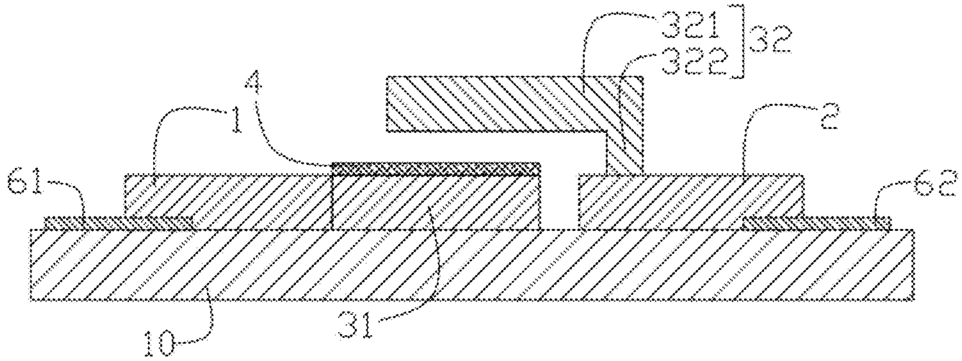

Step 6 includes stripping the sacrificial layer, as shown in FIG. 7F.

After the sacrifice layer is stripped, one end of the horizontal portion 321 of the membrane bridge 32 may be free.

The sacrificial layer may be stripped by means of, for example, wet etching or dry etching.

In an embodiment, after the step 5 is completed and before the step of stripping the sacrificial layer, the method may further include forming at least one hollow portion 34 in the membrane bridge 32, as shown in FIG. 4.

The hollow portion 34 penetrates through the membrane bridge 32 in a direction perpendicular to the plane of the substrate 10.

In the process of fabricating the membrane bridge 32 by using the sacrificial layer, when a process (for example, wet etching or dry etching) for removing the sacrificial layer is performed, an etching solution or plasma may be used to etch the sacrificial layer through the hollow portion 34, so that the etching rate may be increased, and the process efficiency may be further improved. The hollow portion 34 is, for example, a through hole.

It should be noted that, in the present embodiment, although the method of fabricating the phase shifter is described by taking the case of the phase shifter shown in FIG. 1 as an example, in practical applications, the method of fabricating the phase shifter may be adaptively designed according to phase shifters having different structures.

As another technical solution, an embodiment of the present disclosure further provides an antenna, which includes the phase shifter according to the embodiments of the present disclosure.

In summary, the embodiments of the present disclosure provide a phase shifter, a method for fabricating the phase shifter, and an antenna. The phase shifter includes at least one phase control element. Each of the at least one phase control element includes a transmission line extension portion and a membrane bridge, the transmission line extension portion is disposed on the substrate and between the first transmission line and the second transmission line, and the transmission line extension portion is electrically coupled to the first transmission line; the membrane bridge is on a side of the transmission line extension portion distal to the substrate, is opposite to the transmission line extension portion and is arranged spaced apart from the transmission line extension portion, and the membrane bridge is electrically coupled to the second transmission line; a portion of the membrane bridge is configured to move to change a distance from the transmission line extension portion when the first transmission line and the second transmission line are applied with different voltages. By switching between applying different voltages and not applying voltages to the first and second transmission lines, a position at which the portion of the membrane bridge is located may be switched between an initial position and a position closer to the transmission line extension portion than the initial position, thereby changing the spacing between the two capacitor plates formed by the membrane bridge and the transmission line extension portion, and thus the capacitance can be changed. Compared with the method of changing the size of the capacitance utilizing liquid crystal deflection in the prior art, the method of changing the size of the capacitance in the embodiments of the present disclosure can enlarge the change range of the capacitance, so that the phase shifting effect by a single phase control element is more significant. The phase shifter according to the embodiments of the disclosure is a phase shifter based on micro-electro-mechanical system (MEMS), which, compared with the liquid crystal phase shifter, has shorter response time and lower dielectric loss, can expand the usage scenario and reduce the loss of the antenna.

It could be understood that the above embodiments are merely exemplary embodiments used for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

What is claimed is:

1. A phase shifter comprising a substrate, first and second transmission lines spaced apart from each other on the substrate, and at least one phase control element on the substrate, wherein each of the at least one phase control element comprises a transmission line extension portion and a membrane bridge, and the transmission line extension portion is on the substrate, is between the first transmission line and the second transmission line, and is electrically coupled to the first transmission line;

the membrane bridge comprises a first portion, a first support portion and a second support portion, the first portion electrically couples the first support portion to the second support portion, and the membrane bridge is electrically coupled to the second transmission line through the first support portion; and the first portion of the membrane bridge is configured to move in response to the first and second transmission lines being applied with different voltages, so as to change a distance from the first portion of the membrane bridge to the transmission line extension portion, the phase shifter further comprises: an insulating layer, wherein the insulating layer is on the transmission line extension portion and on a side of the transmission line extension portion distal to the substrate, and the second support portion is connected between the first portion and the insulating layer.

2. The phase shifter of claim 1, further comprising first and second bias wires each disposed on the substrate and electrically coupled to the first and second transmission lines, respectively, wherein the first and second bias wires are configured to apply different voltages to the first and second transmission lines, respectively.

3. The phase shifter of claim 1, wherein at least one hollow portion is provided in the membrane bridge, and the at least one hollow portion penetrates through the membrane bridge in a direction perpendicular to a plane in which the substrate is located.

4. The phase shifter of claim 3, wherein the at least one hollow portion penetrates through the first portion in the direction perpendicular to the plane in which the substrate is located.

5. The phase shifter of claim 1, wherein the insulating layer is configured to prevent the first portion of the membrane bridge from electrically communicating with the transmission line extension portion when moving in a direction approaching the transmission line extension portion.

6. The phase shifter of claim 1, wherein the first portion is configured to bend in a direction approaching the transmission line extension portion in response to the first and second transmission lines being applied with different voltages.

7. An antenna, comprising the phase shifter of claim 1.

8. The phase shifter of claim 1, wherein the transmission line extension portion is in a same layer as the first transmission line.

9. The phase shifter of claim 1, wherein the transmission line extension portion and the first transmission line are formed as a single piece.

10. A method for fabricating a phase shifter, comprising:

forming, on a substrate, a first transmission line and a second transmission line spaced apart from each other and a transmission line extension portion of each of at least one phase control element, wherein the transmission line extension portion is between the first transmission line and the second transmission line, and is electrically coupled to the first transmission line;

forming a membrane bridge for each of the at least one phase control element on a side of the transmission line extension portion distal to the substrate, wherein the membrane bridge comprises a first portion, a first support portion and a second support portion, the first portion electrically couples the first support portion to the second support portion, and the membrane bridge is electrically coupled to the second transmission line through the first support portion; and the first portion of the membrane bridge is configured to move in response to the first and second transmission lines being applied with different voltages, so as to change a distance from the first portion of the membrane bridge to the transmission line extension portion, the phase shifter further comprises: an insulating layer, wherein the insulating layer is on the transmission line extension portion and on the side of the transmission line extension portion distal to the substrate, and second support portion is connected between the first portion and the insulating layer.

11. The method of claim 10, wherein the method further comprises:

forming at least one hollow portion in the membrane bridge, the at least one hollow portion penetrating through the membrane bridge in a direction perpendicular to a plane in which the substrate is located.

* * * * *